Aug. 28, 1923.

C. E. NEEDHAM 1,466.455

LUBRICATING MECHANISM FOR BEARINGS OF ROTATABLE MEMBERS

Filed Nov. 16, 1921   2 Sheets-Sheet 1

Inventor.
Charles E. Needham
by Heard Smith & Tennant.
Attys.

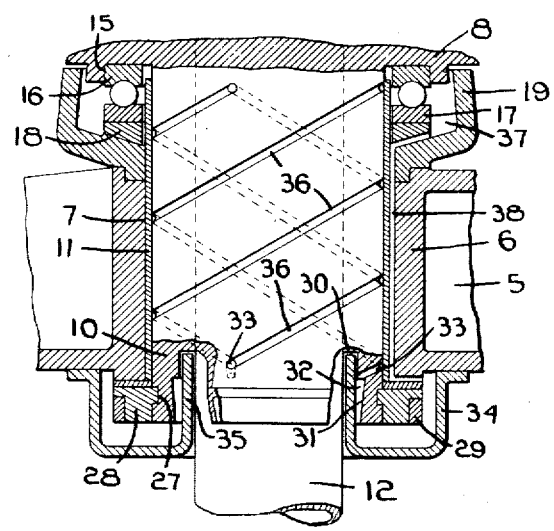

Patented Aug. 28, 1923.

UNITED STATES PATENT OFFICE.

1,466,455

CHARLES E. NEEDHAM, OF ALLENTOWN, PENNSYLVANIA, ASSIGNOR TO BRADLEY PULVERIZER COMPANY, OF BOSTON, MASSACHUSETTS, A CORPORATION OF MAINE.

LUBRICATING MECHANISM FOR BEARINGS OF ROTATABLE MEMBERS.

Application filed November 16, 1921. Serial No. 515,492.

*To all whom it may concern:*

Be it known that I, CHARLES E. NEEDHAM, a citizen of the United States, and resident of Allentown, county of Lehigh, State of Pennsylvania, have invented an Improvement in Lubricating Mechanism for Bearings of Rotatable Members, of which the following description, in connection with the accompanying drawing, is a specification, like characters on the drawing representing like parts.

This invention relates to improvements in lubricating mechanism for the bearings of rotatable members, more particularly of the type in which the member rotates about a vertical axis.

The principal object of the invention is to provide a lubricating mechanism comprising a lubricant supply and means rotatable with said rotatable member for delivering the lubricant to the bearing by centrifugal force in correlation to the speed of rotation of the rotatable member.

More specifically the means for delivering the lubricant to the bearing comprises a chamber having a preferably annular wall located at a distance from the axis of rotation of the rotatable member and rotatable therewith, adapted to direct lubricant from a suitable supply to conduits leading to the bearing for the rotatable member. Preferably the chamber is provided with an open bottom and the end of the wall of the chamber is submerged in the lubricant.

A further object of the invention is to provide means for positively forcing the lubricant, delivered by the conduit, to the bearing longitudinally of the bearing.

A further object of the invention is to provide an overhead supporting thrust bearing which sustains a rotatable member with means for continuously supplying lubricant from a reservoir by centrifugal force to the lower end of the bearing, forcing the same lengthwise of the bearing, delivering the lubricant to the thrust bearing, and finally returning the same to the receptacle.

Other objects and features of the invention will more fully appear from the following description and the accompanying drawings and will be particularly pointed out in the claims.

A preferred embodiment of the invention is illustrated herein as applied to a centrifugal grinding mill having a vertical roll supporting shaft which is suspended from its upper end by a thrust bearing. It will, however, be understood that the invention may be embodied in any other form of mechanism to which it may be applicable.

In the drawings:

Fig. 2 is a detail vertical sectional view through the central portion of the supporting girder for the bearing, showing the hub of the driving mechanism, which supports the vertical roll actuating shaft, in elevation, and illustrating the lubricating mechanism embodying the invention applied thereto.

Figure 1:
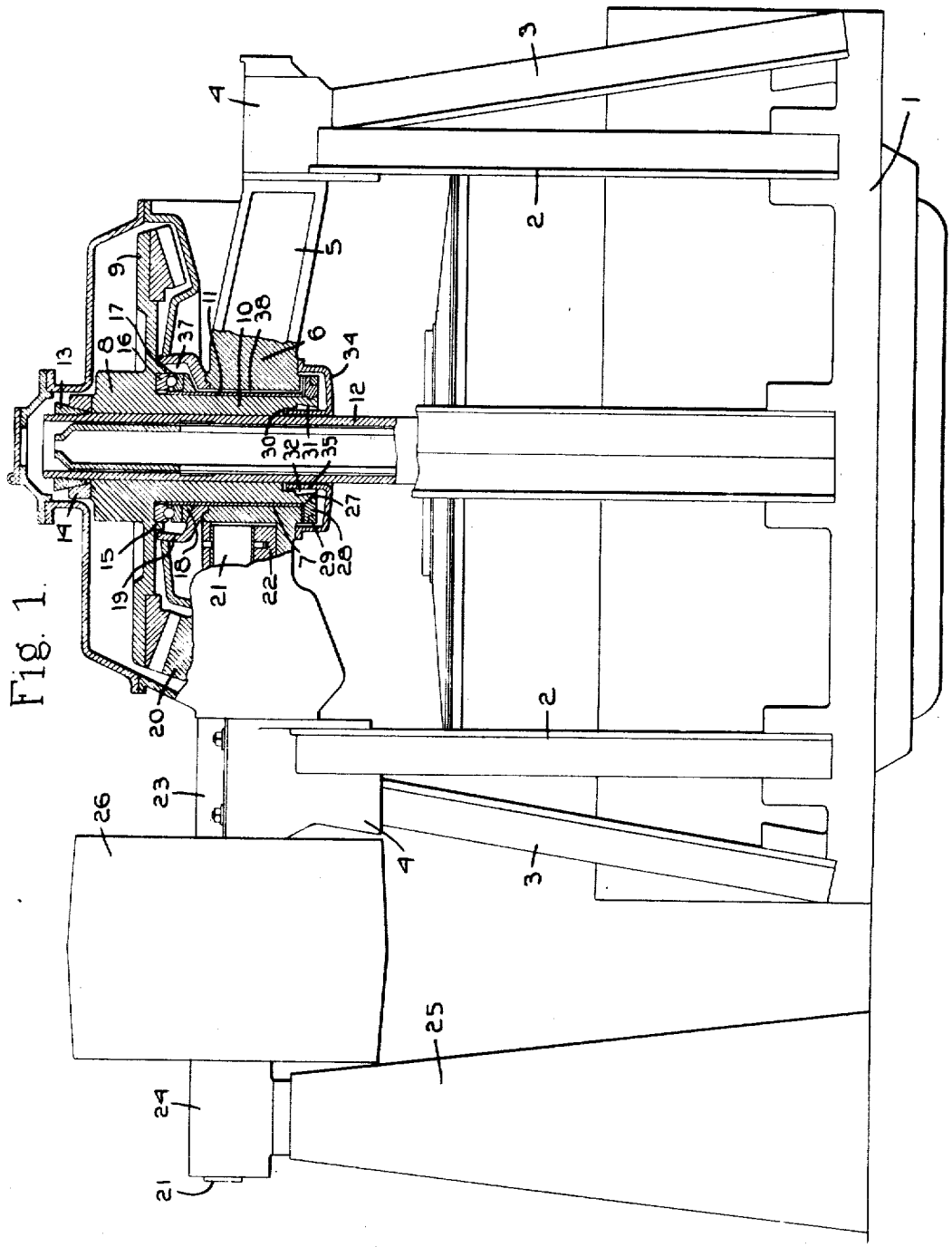
Fig. 1 is a view of a sufficient portion of a grinding mill to illustrate the application of the invention thereto, the rotatable supporting member and its bearing and certain associated mechanisms being illustrated in vertical section.

A preferred embodiment of the invention is disclosed herein as applied to the rotating shaft supporting member of a centrifugal grinding mill of the type disclosed in the application of William A. Gibson and Charles E. Needham, filed November 16, 1921, Serial No. 515,509. In this type of grinding mill the material to be ground is crushed against an annular grinding ring by the centrifugal action of a plurality of rotatable rolls which are carried at the lower ends of vertical shafts which are pivotally mounted at their upper ends upon a carrier which is rotated by a central vertical roll actuating shaft.

As illustrated in the accompanying drawing the grinding mill comprises a base 1 which contains the grinding ring or die, (not shown), standards 2 and braces 3, secured at their lower ends between suitable lugs extending upwardly from the base, support at their upper ends saddles 4 which carry a cross girder 5 which sustains the rotatable parts of the mill. The cross girder 5 desirably is in the form of a slightly arched beam having an enlarged, preferably annular, portion 6 provided with a central aperture 7 through which the vertical roll actuating shaft extends and in which it is carried by the hub 8 of a driving member. The driving member shown herein is in the form of a bevelled gear 9, the hub of which has a downward extension 10 which is journalled in the aperture 7 of the transverse girder 5, a suitable bushing 11 being interposed between the hub extension and the wall of the aperture 7.

The vertical roll actuating shaft 12 is tubular in form and extends axially through the gear hub 8 and is supported at its upper end by a wedge-shaped split nut 13 which engages screw threads upon the upper end of the vertical roll actuating shaft and is seated upon a complementary supporting ring 14 which engages the upper end of the gear hub 8. The lower face of the body of the hub of the gear 8 is provided with an annular recess 15 in which the upper race 16 of a thrust ball bearing is mounted. The lower race 17 of said ball bearing rests upon an aligning washer 18 having a convex under face which engages a complementary concave seat in a cup-shaped member 19 which rests upon the girder 5 and extends upwardly to enclose the thrust ball bearing and forms a lubricant chamber. The bushing 11 for the vertical bearing of the hub extension preferably extends from the lower end of the bearing to the plane of the balls of the thrust bearing in order that lubricant carried upwardly through the vertical bearing may be delivered to the thrust bearing in a manner which will hereinafter more fully appear.

The gear 9 which supports the roll actuating shaft 12 is driven by a pinion 20 secured upon a driving shaft 21 which is journaled in bearings 22 and 23 in one of the arms of the cross girder 5 and in a suitable bearing 24 carried upon a pier 25 and is driven by a pulley 26 located between the bearings 23 and 24.

In order to prevent the gear 9 from riding up upon the pinion and slipping when the mill is being operated under heavy power the lower end of the hub extension 10 projects below the central portion of the transverse girder and is provided with an annular groove 27 which is engaged by a flange upon a sectional collar 28 which is clamped upon the lower end of the hub extension by a sleeve 29, which may be shrunk or otherwise clamped upon said collar.

The construction above described is more fully disclosed in the application of Gibson and Needham above referred to.

The present invention which forms the subject matter of this application is more particularly addressed to a system or mechanism for effectively lubricating the bearing for a rotatable driving member of the character above described, or the bearing for any other type of driving member to which the invention may be applied. In its broad aspect the invention consists in providing a lubricant supply and delivering the lubricant from said supply to the bearing by centrifugal action of means rotatable with the rotatable member, the construction preferably being such that the amount of lubricant thus delivered by centrifugal action will be correlated to the speed of rotation of the rotatable member and consequently will maintain the bearing in a proper state of lubrication at all times. This is accomplished by providing the rotatable member with a chamber having an outer wall located at a distance from the axis of rotation and supplying lubricant to said chamber in such a manner that it will be forced against the outer wall by centrifugal force and be conducted preferably from the upper portion of the chamber to the bearing for the rotatable member.

In the preferred embodiment of the invention illustrated herein the lower end of the hub extension 10 is provided with an upwardly extending annular recess 30 surrounding the roll actuating shaft 12. The outer wall 31 of a portion of said recess extends upwardly and outwardly thereby providing an upwardly expanding chamber 32. Suitable conduits, preferably ports 33 lead from the upper portion of this chamber to the lower portion of the bearing for the rotatable member. An annular lubricant receptacle 34 is secured to the under face of the transverse girder 5 and is provided with an upwardly extending wall 35 which projects above the upper end of the chamber 32. The upwardly extending flange 35 of the receptacle 34 forms the inner wall of the lubricant chamber in the rotatable member.

In the operation of the device sufficient lubricant, preferably oil, is supplied to the receptacle to submerge the lower end of the hub extension so that the lower portion of the upwardly and outwardly inclined wall of the chamber 32 will be submerged in the lubricant. During the rotation of the rotatable member the oil is carried by centrifugal force upwardly along the inclined wall 31 of the lubricant chamber 32 in the hub extension and is delivered from the upper portion of said chamber through the ports 33 to the bearing.

In order to insure lubrication of the entire vertical bearing, and also of the thrust member of the bearing in constructions like the present in which a supporting thrust bearing is employed, the hub extension is provided with one or more spiral grooves 36, adapted to communicate at their lower ends with the port 33, and extending upwardly above the end of the bushing 11 so that the lubricant may be delivered over the upper edge of the bushing to the thrust ball bearing. Any excess of lubricant which passes through the ball bearing is collected in the lubricant chamber 37 formed by the cup-shaped member 19 and may be returned to the receptacle 34 by a suitable conduit such as a duct or groove 38 extending downwardly through the wall of the aperture in the supporting girder. By reason of this construction a continuous circulation of oil will be maintained through the vertical bearing for the rotatable member and also through the anti-friction thrust bearing. The cup-shaped member 19 and the receptacle 34 effectively enclose the upper and lower ends of the bearing and exclude dust from the bearing and also prevent all dripping of oil in the bearing.

It will be understood that while the preferred embodiment of the invention is disclosed herein as applied to the bearing for a centrifugal grinding mill it may be adapted to the bearings for other types of rotatable members, and that whereas the chamber in the rotatable bearing member is disclosed herein as having an open bottom communicating with and enclosing the lubricant receptacle the chamber may be otherwise constructed and supplied with lubricant in such a manner that the centrifugal action of the rotatable member upon the lubricant in the chamber will cause the same to be delivered to the bearing. Therefore, it will be apparent that the present embodiment of the invention is illustrative and not restrictive and that various changes in form, construction and arrangement of parts may be made within the spirit and scope of the following claims.

Having thus described my invention, what I claim as new, and desire to secure by Letters Patent, is:

1. Lubricating mechanism for the bearing of a rotatable member comprising a chamber having an open bottom and provided with a wall located at a distance from the axis of said rotatable member and rotatable therewith, an oil receptacle communicating with said chamber having an inner wall located between the chamber wall and the axis of said rotatable member and means communicating with said chamber and said bearing for conducting to said bearing the lubricant thrown outwardly by centrifugal force during the rotation of said rotatable member.

2. Lubricating mechanism for the bearing of a rotatable member comprising an annular recess in the lower end of said bearing member providing a chamber having an annular wall located at a distance from the axis of said member and rotatable therewith, means for supplying a lubricant to said chamber and a plurality of conduits leading from the upper portion of said chamber to said bearing for conducting to said bearing the lubricant thrown outwardly by centrifugal force during the rotation of said rotatable member.

3. Lubricating mechanism for the bearing of a member rotatable about a vertical axis comprising a chamber open at the bottom and having an annular upwardly extending outwardly inclined outer wall rotatable with said rotatable member, a lubricant receptacle enclosing the open bottom of said chamber having an inner wall concentric with the annular wall of said chamber and a conduit leading through the upper portion of said outer wall to said bearing for conducting to said bearing the lubricant thrown outwardly by centrifugal force during the rotation of said rotatable member.

4. Lubricating mechanism for the bearing of a member rotatable about a vertical axis comprising a chamber open at the bottom and having an annular upwardly extending outwardly inclined outer wall rotatable with said rotatable member, a lubricant receptacle enclosing the open bottom of said chamber and a conduit leading through the upper portion of said outer wall to said bearing for conducting to said bearing the lubricant thrown outwardly by centrifugal force during the rotation of said rotatable member, means for forcing the lubricant upwardly along said bearing and means for returning the lubricant discharged from the upper end of said bearing to said receptacle.

5. Lubricating mechanism for the bearing of a member rotatable about a vertical axis comprising a chamber open at the bottom and having an annular upwardly extending outwardly inclined outer wall rotatable with said rotatable member, a lubricant receptacle enclosing the open bottom of said chamber and a conduit leading through the upper portion of said outer wall to said bearing, a spiral groove communicating with said conduit and extending upwardly along said bearing operable to force the lubricant lengthwise of said bearing and means for returning the lubricant discharged from the upper end of said bearing to said receptacle.

6. Lubricating mechanism for a rotatable member carried by a supporting member having a vertical bearing and a thrust bearing superimposed upon said supporting member; comprising a chamber having an open bottom at the lower end of said rotatable bearing member and an upwardly extending outwardly inclined outer wall, a lubricant receptacle enclosing the open bottom of said chamber, conduits leading from the upper portion of said chamber to said bearing for conveying to said bearing the lubricant in said chamber thrown outwardly by centrifugal force, means for forcing said lubricant through said vertical bearing to said thrust bearing and means for returning the excess of lubricant from said thrust bearing to said receptacle.

7. Lubricating mechanism for a centrifugal grinding mill having a vertical roll actuating shaft, a frame having an upper supporting girder provided with a vertical aperture for said roll actuating shaft and driving means supporting said shaft having a hub journalled in said aperture; comprising an oil receptacle enclosing the lower end of said hub and provided with an inner wall located adjacent to said shaft, a chamber in the lower end of said hub having an annular upwardly and outwardly extending wall and a conduit leading from the upper portion of said chamber through the wall surrounding the inner wall of said receptacle of said hub whereby the oil will be delivered by centrifugal force to the bearings of said hub.

8. Lubricating mechanism for a centrifugal grinding mill having a vertical roll actuating shaft, a frame having an upper supporting girder provided with a vertical aperture for said roll actuating shaft and driving means supporting said shaft having a hub journalled in said aperture; comprising an oil receptacle enclosing the lower end of said hub, a chamber in the lower end of said hub having an annular upwardly and outwardly extending wall and a conduit leading from the upper portion of said chamber through the wall of said hub whereby the oil will be delivered by centrifugal force to the bearings of said hub, a spiral groove in the outer surface of said hub leading from said conduit to the upper end of said hub and means for returning the excess of oil delivered at the upper end of said hub to said receptacle.

9. Lubricating mechanism for a centrifugal grinding mill having a vertical roll actuating shaft, a frame having an upper supporting girder provided with a vertical aperture for said roll actuating shaft, driving means supporting said shaft having a hub provided with an extension journalled in said aperture and a thrust bearing carried by said girder supporting said driving member, adjacent the upper portion of said hub extension, comprising an oil receptacle enclosing the lower end of said hub extension, a chamber in the lower end of said hub having an open bottom and an upwardly and outwardly flaring wall, conduits leading from the upper portion of said chamber through the wall of the hub to said bearing for conducting to said bearing the oil thrown outwardly by centrifugal force during the rotation of said rotatable member, a spiral groove in the outer surface of said hub adapted to communicate with said conduits leading to the upper end of said bearing, means enclosing said thrust bearing to receive the excess of oil transmitted to said thrust bearing and means for returning said excess of oil to said receptacle.

In testimony whereof, I have signed my name to this specification.

CHARLES E. NEEDHAM.

Certificate of Correction.

It is hereby certified that in Letters Patent No. 1,466,455, granted August 28, 1923, upon the application of Charles E. Needham, of Allentown, Pennsylvania, for an improvement in "Lubricating Mechanism for Bearings of Rotatable Members," an error appears in the printed specification requiring correction as follows: Page 4, lines 10 and 11, claim 7, strike out the words "surrounding the inner wall of said receptac'e" and insert the same to follow the word "wall" in line 8; and that the said Letters Patent should be read with this correction therein that the same may conform to the record of the case in the Patent Office.

Signed and sealed this 16th day of October, A. D., 1923.

[SEAL.]
WM. A. KINNAN,
*Acting Commissioner of Patents.*